United States Patent
Golcher Ugalde et al.

(10) Patent No.: US 10,135,526 B2
(45) Date of Patent: *Nov. 20, 2018

(54) BANDWIDTH THROTTLING

(71) Applicant: INTERNATIONAL BUSINESS MACHINES CORPORATION, Armonk, NY (US)

(72) Inventors: Ricardo A. Golcher Ugalde, San Jose (CR); Franz F. Liebinger Portela, Heredia (CR); Meller J. Perez Nunez, San Jose (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,597

(22) Filed: Nov. 7, 2017

(65) Prior Publication Data
US 2018/0062739 A1    Mar. 1, 2018

Related U.S. Application Data

(63) Continuation of application No. 14/921,071, filed on Oct. 23, 2015.

(51) Int. Cl.
*H04B 10/00* (2013.01)
*H04B 10/079* (2013.01)
(Continued)

(52) U.S. Cl.
CPC ..... *H04B 10/0791* (2013.01); *H04B 10/0775* (2013.01); *H04B 10/0795* (2013.01); *H04B 10/2581* (2013.01); *H05K 999/99* (2013.01)

(58) Field of Classification Search
CPC .............. H04B 10/0791; H04B 10/0795
See application file for complete search history.

(56) References Cited

U.S. PATENT DOCUMENTS

| 5,335,104 A | 8/1994 | Johnson |
| 6,419,404 B1 | 7/2002 | Deri et al. |

(Continued)

FOREIGN PATENT DOCUMENTS

| CN | 1695325 | 11/2005 |
| CN | 2012143070 | 2/2012 |

(Continued)

OTHER PUBLICATIONS

Bromberg, Yaron et al.; Secure Optical Communication Using Random Mode Mixing and Time-Reversal Symmetry in Multimode Fibers; CLEO: QELS Fundamental Science 2014, OSA Technical Digest, CLEO: 2014 Postdeadline Paper Digest; Jun. 8-13, 2014; 2 pages.

(Continued)

*Primary Examiner* — Agustin Bello
(74) *Attorney, Agent, or Firm* — Schmeiser, Olsen & Watts; Mark C. Vallone

(57) ABSTRACT

A bandwidth throttling method is provided. The method includes receiving by a receiver from a QD Vcel cannon, a plurality of multi-frequency light pulses via a plurality of channels. The receiver determines that the plurality of multi-frequency light pulses comprises an out of band (OOB) signal transmitted over a first channel of the plurality of channels. The receiver receives from a first laser device of the QD Vcel cannon, a first light pulse of the plurality of multi-frequency light pulses. The first light pulse includes a first frequency for testing a visibility of the first light pulse at the receiver. The receiver determines if the first light pulse is visible at the receiver.

18 Claims, 5 Drawing Sheets

(51) Int. Cl.
*H04B 10/077* (2013.01)
*H04B 10/2581* (2013.01)

(56) References Cited

U.S. PATENT DOCUMENTS

| | | |
|---|---|---|
| 6,768,577 B2 | 7/2004 | Eggleton et al. |
| 6,996,140 B2 | 2/2006 | Waarts et al. |
| 7,209,560 B1 | 4/2007 | Fairman et al. |
| 7,433,598 B2 | 10/2008 | Schemmann et al. |
| 8,078,059 B2 | 12/2011 | Fuse |
| 8,111,777 B2 | 2/2012 | Agazzi |
| 8,290,323 B2 | 10/2012 | Donlagic |
| 8,417,069 B2 | 4/2013 | Chen |
| 2003/0076248 A1 | 4/2003 | Larson |
| 2004/0131093 A1 | 7/2004 | Waarts et al. |
| 2005/0144646 A1 | 6/2005 | Le Crom et al. |
| 2005/0261560 A1 | 11/2005 | Ridder et al. |
| 2008/0219307 A1 | 9/2008 | Birkedal et al. |
| 2009/0167486 A1 | 7/2009 | Shah et al. |
| 2009/0260501 A1 | 10/2009 | Kashyap |
| 2009/0327724 A1 | 12/2009 | Shah et al. |
| 2014/0094121 A1 | 4/2014 | Ben-Shalom et al. |
| 2014/0186033 A1 | 7/2014 | Winzer et al. |
| 2014/0244723 A1 | 8/2014 | Gong et al. |
| 2014/0314410 A1 | 10/2014 | Mumtaz et al. |
| 2015/0010031 A1 | 1/2015 | Makino et al. |
| 2015/0029851 A1 | 1/2015 | Haydock et al. |
| 2015/0043912 A1 | 2/2015 | Paredes et al. |
| 2015/0205039 A1 | 7/2015 | Molin et al. |
| 2016/0365897 A1 | 12/2016 | Gross et al. |
| 2017/0117958 A1 | 4/2017 | Golcher Ugalde et al. |
| 2017/0155455 A1 | 6/2017 | Golcher Ugalde et al. |

FOREIGN PATENT DOCUMENTS

| | | |
|---|---|---|
| CN | 102519502 | 6/2012 |
| CN | 102156322 | 9/2013 |
| JP | 2014506433 | 3/2014 |
| WO | 0167646 | 9/2001 |
| WO | 03043246 | 5/2003 |
| WO | 2009003228 | 1/2009 |
| WO | 2012175697 | 12/2012 |
| WO | 2014057299 | 4/2014 |
| WO | 2014105579 | 7/2014 |

OTHER PUBLICATIONS

Maksymiuk, L., et al.; Multimode fiber bandwidth increase by means of spatial light filtration; 2010 19th Annual Wireless and Optical Communications Conference (WOCC); May 14-15, 2010; pp. 1-4.

PCT Notification of Transmittal of the International Search Report and the Written Opinion of the International Searching Authority, of the Declaration; dated Dec. 1, 2016; International Application No. PCT/IB2016/055260; Filing Date Sep. 2, 2016; Applicant's file reference CA150046; 11 pges.

Thomsen, Benn et al.; Exploiting the bandwidth potential of multimode optical fibres; Retrieved from the Internet, URL: http://www.ee.ucl.ac.uk/ong/group-research/comimo; retrieved on Feb. 26, 2015; 2 pages.

Friedman, Mark J.; List of IBM Patents or Patent Applications Treated as Related; Nov. 7, 2017; 1 page.

Examination Report under Section 18(3) dated Mar. 1, 2018; UK Intellectual Property Office; Application No. GB1801216.1; 6 pages.

Response submitted Apr. 17, 2018 to Examination Report under Section 18(3) dated Mar. 1, 2018; UK Intellectual Property Office; Application No. GB1801216.1; 6 pages.

Jeong, Gibong et al.; Long-Distance Parallel Data Link Using WDM Transmission with Bit-Skew Compensation; Journal of Lightwave Technology, vol. 14, No. 5; May 1996; pp. 655-660.

BANDWIDTH THROTTLING

This application is a continuation application claiming priority to Ser. No. 14/921,071 filed Oct. 23, 2015, now U.S. Pat. No. 9,887,771, issued Feb. 6, 2018.

FIELD

The present invention relates generally to a method for using multimode fiber optic capability to transport several frequency light pulses and in particular to a method and associated system for transport several frequency light pulses to achieve a maximum available band width for use in communications systems.

BACKGROUND

A fiber optics infrastructure typically requires an enormous data transfer speed. The transfer speed may be increased to a higher level enabling data transfer for transmission in a binary format using multimode fiber capacity to transfer data with respect to a higher base format such as like hexadecimal etc. to achieve higher transfer rates using a same fiber.

A typical fiber optics system may include tunable multimode laser diode modules. A tunable multimode laser diode module may enable a method for controlling tunable multimode laser diodes, raman pumps, and raman amplifiers. The aforementioned system may not be able to achieve higher data transfer rates An additional typical fiber optics system may include single cannon light beams. A single cannon light beam only uses a single cannon for data transfer thereby limiting data transfer rates.

Optical communications systems may achieve very high data rates resulting from high bandwidth of optical fibers and the availability of specific high-speed laser systems. However a demand for increasing speed in communications may cause a typical optical fiber to be unable to provide an unlimited bandwidth.

The aforementioned solutions may require the use of a specified type of fiber optic cable thereby limiting the functionality of fiber optic communication systems. Additionally, the aforementioned solutions may result in an increase in the amount of noise introduced into the system thereby reducing a quality of the transmitted signals.

Accordingly, there exists a need in the art to dynamically adjust to failures in any frequency channel of a fiber optics system.

SUMMARY

A first aspect of the invention provides a bandwidth throttling calibration method comprising: receiving, by a receiver device from a QD Vcel cannon, a plurality of multi-frequency light pulses via a plurality of channels; first determining, by a computer co-processor of the receiver device, that the plurality of multi-frequency light pulses comprises an out of band (OOB) signal transmitted over a first channel of the plurality of channels; receiving, by the receiver device from a first laser device of the QD Vcel cannon, a first light pulse of the plurality of multi-frequency light pulses, the first light pulse comprising a first frequency for testing a visibility of the first light pulse at the receiver device; and second determining, by the computer co-processor in response to the receiving the first light pulse, if the first light pulse is visible at the receiver device.

A second aspect of the invention provides a bandwidth throttling communication method comprising: assigning, by a computer co-processor of a receiver device based on a laser pattern table describing laser generated light pulses, bit locations for a plurality of multi-frequency light pulses transmitted over a plurality of channels enabled by lasers of a QD Vcel cannon; appending by the computer co-processor, a parity bit associated with an out of band (OOB) signal transmitted over a first channel of the plurality of channels; comparing, by the computer co-processor at the receiver device, an odd or even number of frequencies of the plurality of multi-frequency light pulses with the parity bit; and determining, by the computer co-processor based on results of the comparing, if a pattern associated with the plurality of multi-frequency light pulses comprises a correct pattern.

A third aspect of the invention provides a receiver device comprising a computer co-processor coupled to a computer-readable memory unit, the memory unit comprising instructions that when executed by the computer processor implements a bandwidth throttling calibration method comprising: receiving, by the receiver device from a QD Vcel cannon, a plurality of multi-frequency light pulses via a plurality of channels; first determining, by the computer co-processor of the receiver device, that the plurality of multi-frequency light pulses comprises an out of band (OOB) signal transmitted over a first channel of the plurality of channels; receiving, by the receiver device from a first laser device of the QD Vcel cannon, a first light pulse of the plurality of multi-frequency light pulses, the first light pulse comprising a first frequency for testing a visibility of the first light pulse at the receiver device; and second determining, by the computer co-processor in response to the receiving the first light pulse, if the first light pulse is visible at the receiver device.

A fourth aspect of the invention provides a receiver device comprising a computer co-processor coupled to a computer-readable memory unit, the memory unit comprising instructions that when executed by the computer co-processor implements a bandwidth throttling communication method comprising: assigning, by the computer co-processor based on a laser pattern table describing laser generated light pulses, bit locations for a plurality of multi-frequency light pulses transmitted over a plurality of channels enabled by lasers of a QD Vcel cannon; appending by the computer co-processor, a parity bit associated with an out of band (OOB) signal transmitted over a first channel of the plurality of channels; comparing, by the computer co-processor at the receiver device, an odd or even number of frequencies of the plurality of multi-frequency light pulses with the parity bit; and determining, by the computer co-processor based on results of the comparing, if a pattern associated with the plurality of multi-frequency light pulses comprises a correct pattern.

A fifth aspect of the invention provides an bandwidth throttling method comprising: simultaneously emitting, by a multiple QD Vcel array of a transmitter light via a plurality of channels; emitting, by an out of band laser of the transmitter, a signal and a checksum; receiving, by a laser receiver, a light wave band color; determining, by said laser receiver, a light wave color combination producing a resulting light wave; caching, by a co-processor, a bit pattern until a complete frame is filled and passed through processing of higher level protocols; verifying, by the co-processor, verify a checksum of the bit pattern with respect to received out of band information to determine if the laser receiver received data properly from the transmitter or requires re-transmission via a legacy sender; and in response to receiving an out of band signal from the out of band laser, initiating by the laser receiver, a calibration process.

The present invention advantageously provides a simple method and associated system capable of enabling high data transfer rates.

DETAILED DESCRIPTION

Figure 1:
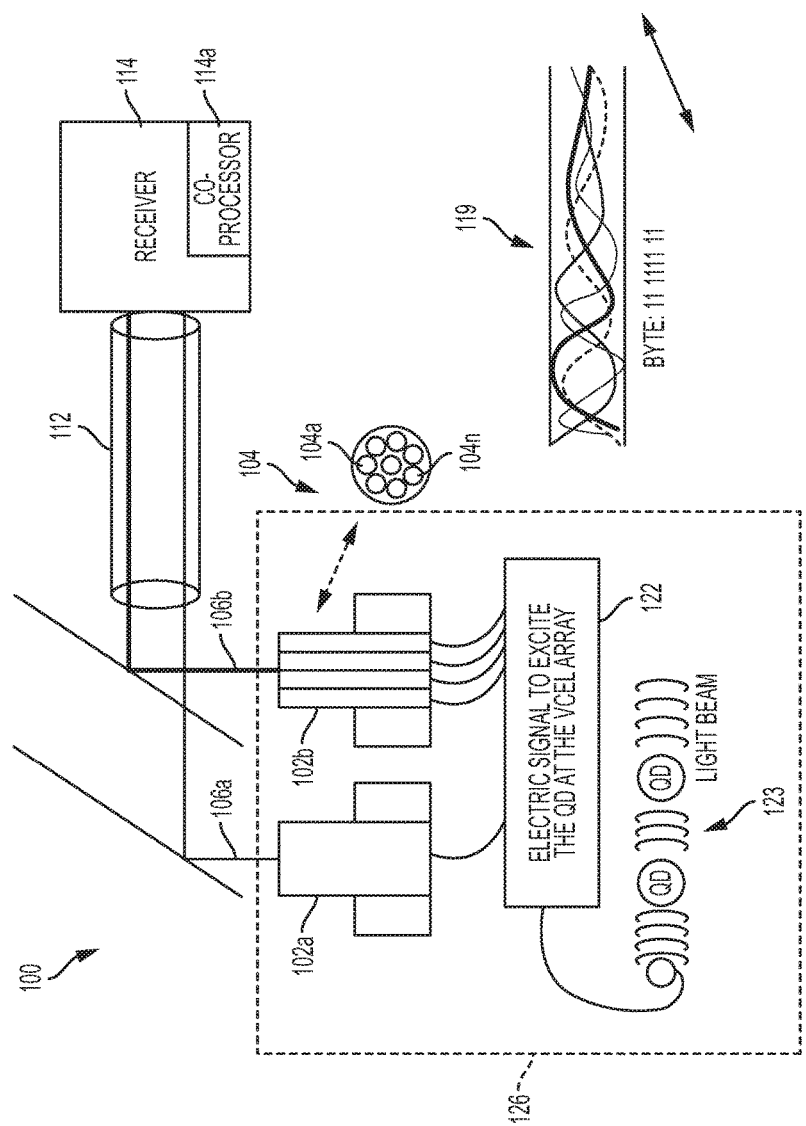
FIG. 1 illustrates a system for transmitting multiple frequency light pulses for enabling a maximum available bandwidth for use in communications systems, in accordance with embodiments of the present invention.

FIG. 1 illustrates a system 100 for transmitting multiple frequency light pulses for enabling a maximum available bandwidth for use in communications systems, in accordance with embodiments of the present invention. System 100 comprises (QD Vcel) laser cannons 102a and 102b (of a transmitter apparatus 126) transmitting the light signals to a receiver apparatus 114. Laser cannon 102a comprises an out of band (OOB) single laser device. Laser cannon 102b comprises a multiple laser cannon device. Front view 104 of laser canon 102b illustrates multiple laser crystals 104a . . . 104n for data transmission. System 100 combines a set of frequencies 106a and 106b (generated by laser canons 102a and 102b) together into a single (multimode) fiber cable 112. The combined set of frequencies represents patterns of bits 119 with respect to each light pulse.

Typical fiber optics systems include tunable multimode laser diode modules to control tunable multimode laser diodes and a single cannon light beam only using a single cannon for data transfer thereby limiting data transfer rates. Additionally, fiber optics systems are typically limited to a single type of fiber optic cable to connect between transmitting and receiving devices. In contrast, system 100 uses multimode fiber optic capability to transport several frequency light pulses. Additionally, the use of a higher grade fiber comprising lower noise ratios promote longer distance communications and therefore system 100 is configured to adapt to the conditions of any fiber type and noise introduced into the system by external sources or by interference or attenuation within the fiber itself. Although the use of VCELS in a transmitter is not a requirement as any laser technology may be used to generate a transmit cluster, system 100 enables the use of VCELS to provide a maximum available bandwidth for use in communications systems. System 100 further utilizes preformed apertures to carry out of band signaling as well as multiple transmitter and receiver cluster group transmissions for transmitting and receiving using any type of fiber. Therefore system 100 enables transport a several frequency light pulses over any type of fiber optic cable to achieve a maximum available band width without introducing additional external noise into a communications system.

Transmitter apparatus 126 and receiver apparatus 114 may each comprise a specialized hardware device comprising specialized (non-generic) hardware and circuitry (i.e., specialized discrete non-generic analog, digital, and logic based circuitry) for executing a process described with respect to FIGS. 1-4. The specialized discrete non-generic analog, digital, and logic based circuitry may include proprietary specially designed components (e.g., a specialized integrated circuit designed for only implementing an automated process for transmitting multiple frequency light pulses for enabling a maximum available bandwidth for use in communications systems.

System 100 enables the use of a multimode fiber capacity by using differing crystal sizes (i.e., for laser devices 104a . . . 104n) for laser cannon 102b to enable input of differing wave lengths into fiber cable 112. A communications process is initiated when a transmitter 122 enables an attenuation test by firing a laser beam with respect to each of laser crystals 104a . . . 104n such that receiver device 114 expects a receiver acknowledge signal for each of laser crystals 104a . . . 104n. The attenuation test is continuously run until any unsuccessful transmitter crystals (of laser crystals 104a . . . 104n) are disabled. In response, a maximum number of concurrent signals for transmission as well as a numeric base upon which data communication will occur are set. Additionally, a calibration phase is enabled. The calibration phase comprises transmitting a sequence of binary frames starting from a highest number of active crystals down to one active crystal and registering a definition for each color frame.

System 100 comprises a sender apparatus 126 and (laser) receiver apparatus 114. Sender apparatus comprises a light beam 123, transmitter 122, and laser canons 102a and 102b. Receiver apparatus 114 comprises a controller co-processor 114a. Receiver apparatus 114 is enabled to receive any light wave band color and determine (via co-processor 114a) light wave color combinations that produced a resulting wave. In response, co-processor 114a caches a resulting bit pattern until the bit pattern fills a complete frame. The completed bit pattern is passed through processing with respect to higher level protocols. The co-processor verifies a bit pattern checksum against received out of band information, to ensure data was received properly or requires re-transmission. If sender apparatus 126 comprises a legacy sender unit, system 100 will detect a light pattern and disable co-processor 114a functionality to conserve power. Sender apparatus 126 comprises a multiple QD Vcel array for emitting multiple channels or "colors" simultaneously as well as an out of band (IR or UV) laser emitting signaling and checksum bits.

System 100 enables a process as follows:

Upon receiving an out of band signal, system 100 initiates a (bandwidth throttling) calibration process. If receiver apparatus 114 receives light pulses and no out of band signal is detected, system 100 enables a legacy mode, and disables throttling functionality. The calibration process comprises enabling and disabling each of the Vcel lasers and determining a received color. Additionally, a series of all enabled/some enabled or all off Vcel laser pulses are processed to ensure that an aggregation of colors is being detected reliably. The calibration process includes:

1. Receiving (by receiver apparatus 114 from QD Vcel cannon 106a) a group of multi-frequency light pulses via a plurality of channels.

2. A co-processor determines that the group of multi-frequency light pulses comprises an out of band (OOB) signal transmitted over a first channel of the plurality of channels.
3. Receiver apparatus 114 received (from a first laser device of QD Vcel cannon) a first light pulse of the plurality of multi-frequency light pulses. The first light pulse includes a first frequency for testing a visibility of the first light pulse at receiver apparatus 114.
4. The co-processor determines (in response to receiving the first light pulse) if the first light pulse is visible at receiver apparatus 114. If the first light pulse is visible at receiver apparatus 114 then all laser devices are independently tested and differing groups of the lasers are tested within a specified threshold until the calibration process has completed. If the first light pulse is not visible at receiver apparatus 114 then the laser device is disabled and additional laser devices are tested until the calibration process has completed.

Upon completion of the calibration process, co-processor 114a determines a base at which the data transmission will be throttled, (1x–"n"x) and a (bandwidth throttling) communication process is initiated. If an error detection of more than an acceptable amount of packets is determined then, the calibration process will re-start to eliminate unreliable channels. The communication process includes:
1. Assigning (by the computer co-processor) bit locations for a plurality of multi-frequency light pulses transmitted over a plurality of channels enabled by the lasers of the QD Vcel cannon. The assignment is based on a laser pattern table (generated during the calibration process) describing laser generated light pulses.
2. The co-processor appends a parity bit associated with the OOB signal transmitted over a first channel of the plurality of channels.
3. An odd or even number of frequencies of the plurality of multi-frequency light pulses are compared with the parity bit.
4. It is determined (based on results of the comparison) if a pattern associated with the plurality of multi-frequency light pulses comprises a correct pattern. If the pattern is correct then bit locations for an additional plurality of multi-frequency light pulses transmitted over an additional plurality of channels enabled by the lasers of the QD Vcel cannon are assigned based on the laser pattern table. If the pattern is not correct then plurality of multi-frequency light pulses are re-transmitted over the plurality of channels to determine a correct pattern.

Figure 2:
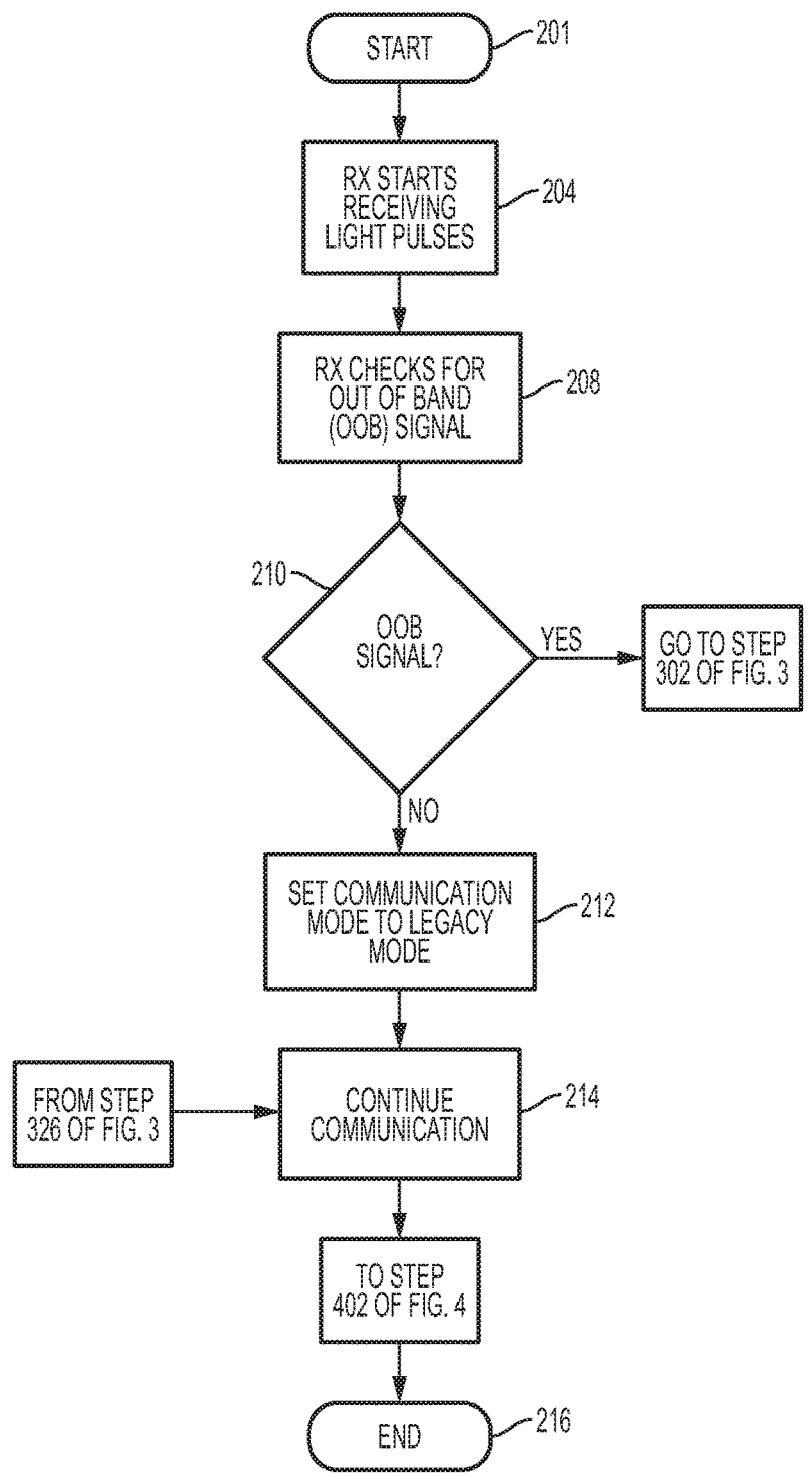
FIG. 2 illustrates a flowchart detailing an overall process enabled by the system of FIG. 1 for transmitting multiple frequency light pulses for enabling a maximum available bandwidth for use in communications systems, in accordance with embodiments of the present invention.
Figure 3:
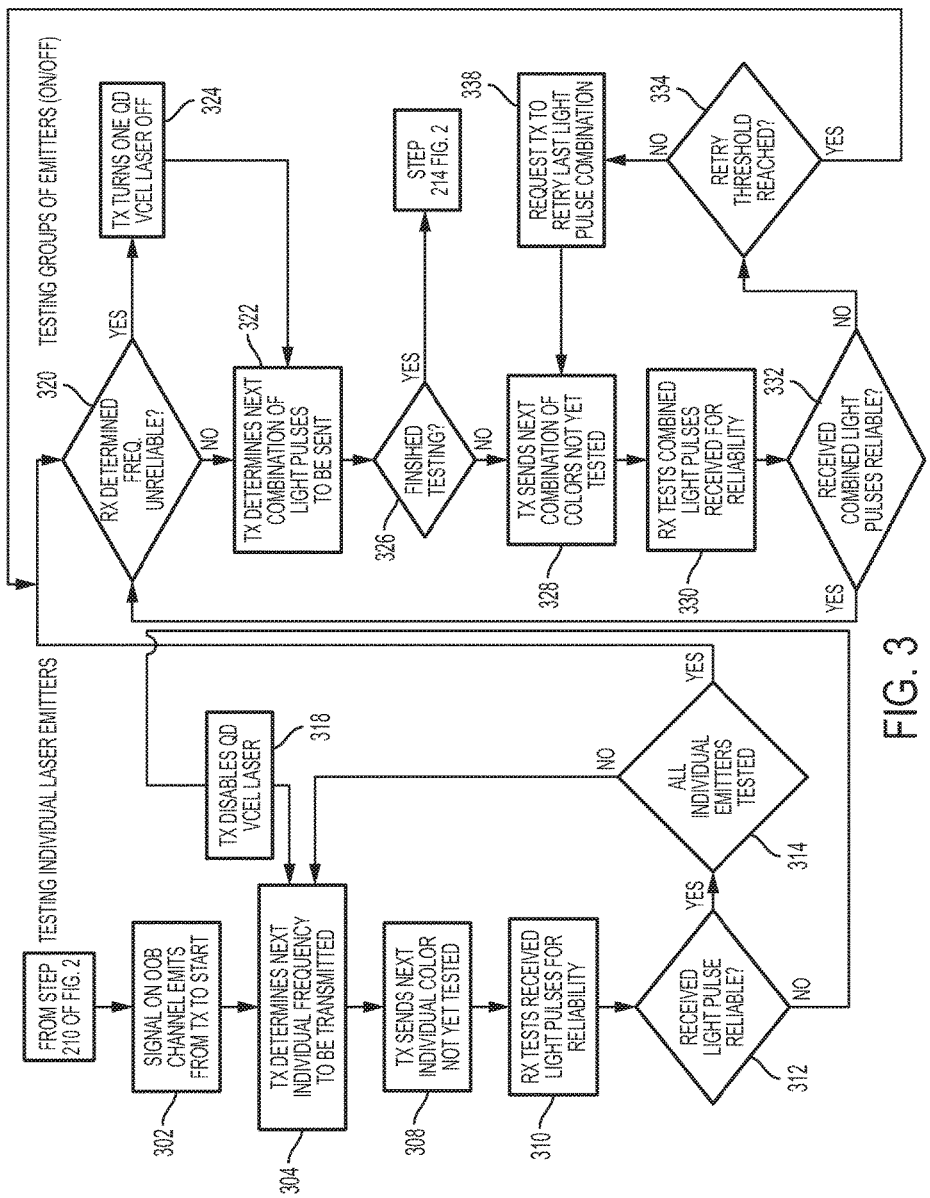
FIG. 3 illustrates a flowchart detailing a calibration process enabled by the system of FIG. 1, in accordance with embodiments of the present invention.

FIG. 2 illustrates a flowchart detailing an overall process enabled by system 100 of FIG. 1 for transmitting multiple frequency light pulses for enabling a maximum available bandwidth for use in communications systems, in accordance with embodiments of the present invention. Each of the steps in the algorithm of FIG. 2 may be enabled and executed in any order by a computer processor executing specialized computer code. In step 201, the process is initiated. In step 204, a receiver apparatus (e.g., receiver apparatus 114 of FIG. 1) receives (from a QD Vcel cannon of a transmitter apparatus) a plurality of multi-frequency light pulses via a plurality of channels. In step 208, a (computer) co-processor of the receiver apparatus checks for an OOB signal. If in step 210, the co-processor determines that the plurality of multi-frequency light pulses comprises an OOB, then step 302 of FIG. 3 is executed as described with respect to FIG. 3, infra. If in step 210, the co-processor determines that the plurality of multi-frequency light pulses does not comprise an OOB, then in step 212, a legacy communication mode is enabled. In step 214, communications are transmitted and step 402 of FIG. 3 is executed as described with respect to FIG. 4, infra. The process is terminated in step 216.

FIG. 3 illustrates a flowchart detailing a calibration process enabled by system 100 of FIG. 1 for transmitting multiple frequency light pulses for enabling a maximum available bandwidth for use in communications systems, in accordance with embodiments of the present invention. Each of the steps in the algorithm of FIG. 3 may be enabled and executed in any order by a computer processor executing specialized computer code. In step 302, a signal is transmitted from a transmitter device over an OOB channel. In step 304, the transmitter device determines a next individual frequency light pulse (e.g., light pulse or color) to be transmitted. In step 308, next individual frequency light pulse (i.e., that has not been tested) is transmitted to a receiver apparatus. In step 310, the receiver apparatus tests the received individual frequency light pulse for reliability. In step 312, it is determined if the received individual frequency light pulse is reliable (i.e., visible). If in step 312, it is determined that the received individual frequency light pulse is not reliable then in step 318 the transmitter apparatus disables the associated QD Vcel laser transmitting the received individual frequency light pulse and step 304 is repeated to determine another individual frequency light pulse for transmission. If in step 312, it is determined that the received individual frequency light pulse is reliable then in step 314, it is determined if all individual laser emitters have been tested. If in step 314, it is determined that all individual laser emitters have not been tested then step 304 is repeated. If in step 314, it is determined that all individual laser emitters have been tested then in step 320, it is determined if the received individual frequency light pulse is unreliable. If in step 320, it is determined that the received individual frequency light pulse is unreliable then in step 324, the transmitter apparatus disables an associated Vcel laser and step 322 in executed as described, infra. If in step 320, it is determined that the received individual frequency light pulse is not unreliable then in step 322, the transmitter apparatus determines a group of multiple frequency light pulses for transmission. In step 326, it is determined if the testing process has completed. If the testing process has completed then step 214 of FIG. 2 is executed as described, supra. If the testing process has not completed then in step 328, the transmitter apparatus transmits a next group of multiple frequency light pulses (that have not been tested) for transmission. In step 330, the receiver tests the next group of multiple frequency light pulses for reliability and in step 332 it is determined if the received (i.e., from step 328) group of multiple frequency light pulses is reliable. If the received group of multiple frequency light pulses is reliable then step 320 is repeated. If the received group of multiple frequency light pulses are not reliable then in step 334 it is determined if a testing retry threshold has been reached. If the retry threshold has been reached then step 320 is repeated. If the retry threshold has not been reached then in step 338, a request for the transmitter apparatus to retry a last frequency light pulse combination is enabled and step 328 is repeated.

Figure 4:
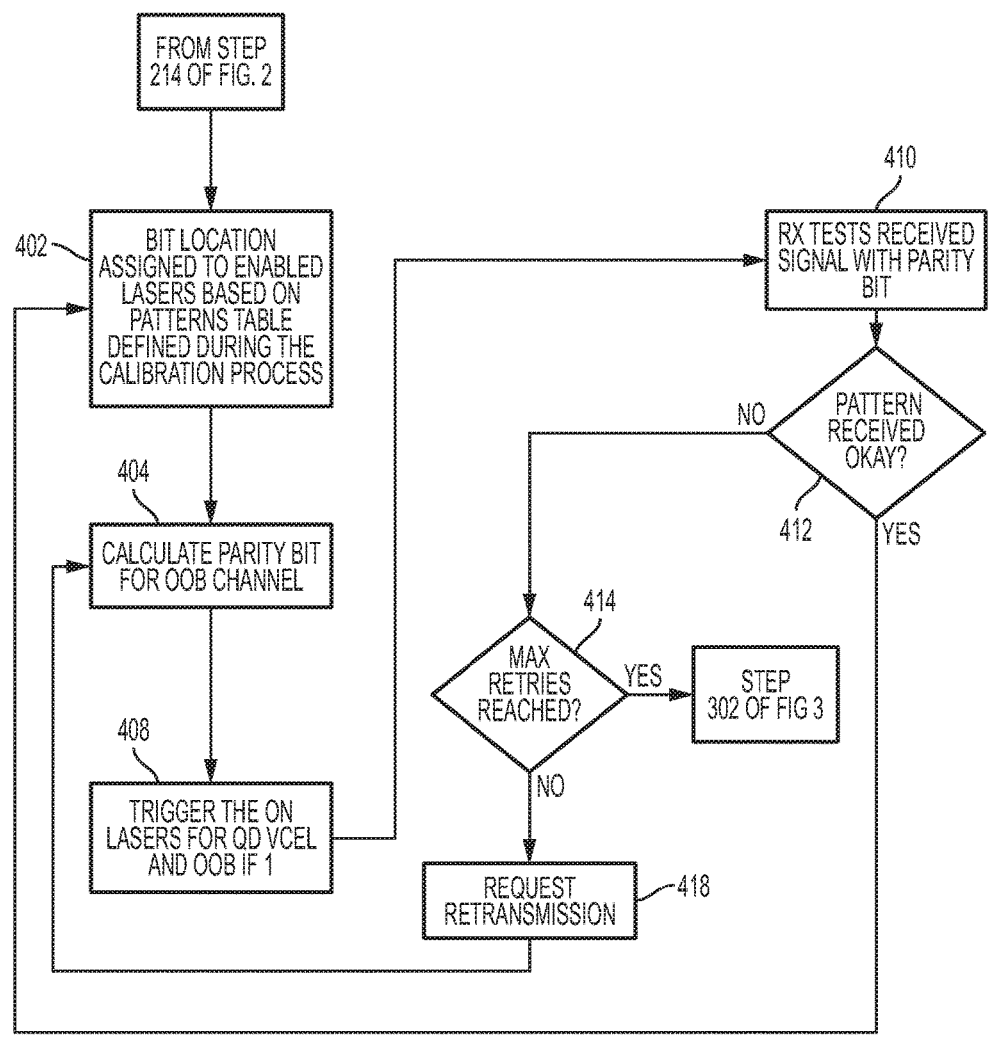
FIG. 4 illustrates a flowchart detailing a communication process enabled by the system of FIG. 1, in accordance with embodiments of the present invention.

FIG. 4 illustrates a flowchart detailing a communication process enabled by system 100 of FIG. 1 for transmitting multiple frequency light pulses for enabling a maximum available bandwidth for use in communications systems, in accordance with embodiments of the present invention. Each of the steps in the algorithm of FIG. 4 may be enabled and executed in any order by a computer processor executing specialized computer code. In step 402, a bit location is assigned to enabled lasers (e.g., of laser devices 104a . . . 104n of laser cannon 102b of FIG. 1) based on a laser pattern table describing laser generated light pulses defined during the calibration process described with respect to FIG. 3. In step 404, a parity bit is calculated for an OOB channel. In step 408, enabled lasers for a QD Vcel laser and associated OOB are triggered for a logical high bit. In step 410, the receiver apparatus tests a received signal with respect to the parity bit. In step, 412, it is determined if the bit pattern is reliably received. If the bit pattern is reliably received then step 402 is repeated. If the bit pattern is not reliably received then in step 414, it is determined if a maximum number of bit pattern receiving tries has been reached. If it is determined that a maximum number of bit pattern receiving tries has been reached then step 302 is repeated. If it is determined that a maximum number of bit pattern receiving tries has been reached then in step 418, a retransmission for the bit pattern is requested and step 404 is repeated.

Figure 5:
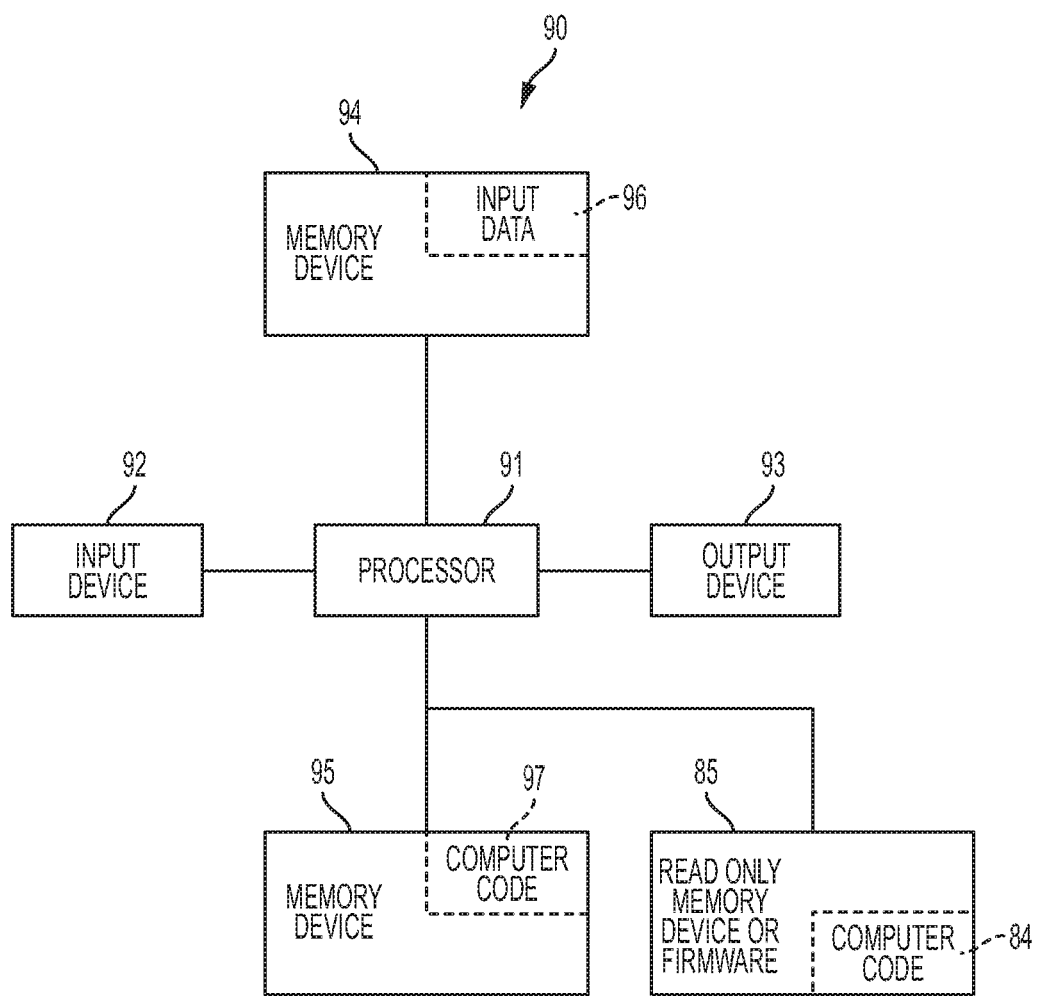
FIG. 5 illustrates a computer system 90 for transmitting multiple frequency light pulses for enabling a maximum available bandwidth for use in communications systems, in accordance with embodiments of the present invention.

FIG. 5 illustrates a computer system 90 (e.g., receiver apparatus 114 or transmitter apparatus 126 of FIG. 1) for transmitting multiple frequency light pulses for enabling a maximum available bandwidth for use in communications systems, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIGS. 2 and 3) for transmitting multiple frequency light pulses for enabling a maximum available bandwidth for use in communications systems. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2 and 3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to transmit multiple frequency light pulses for enabling a maximum available bandwidth for use in communications systems. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for transmitting multiple frequency light pulses for enabling a maximum available bandwidth for use in communications systems. In another embodiment, the invention provides a business method that performs the process steps of the invention on a subscription, advertising, and/or fee basis. That is, a service supplier, such as a Solution Integrator, could offer to transmit multiple frequency light pulses for enabling a maximum available bandwidth for use in communications systems. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A bandwidth throttling calibration method comprising:
   first determining, by a computer co-processor of a receiver device, that a plurality of multi-frequency light pulses, received from a laser cannon via a plurality of channels, comprises an out of band (OOB) signal transmitted over a first channel of said plurality of channels;
   receiving, by said receiver device from a first laser device of said laser cannon, a first light pulse of said plurality of multi-frequency light pulses, said first light pulse comprising a first frequency for testing a visibility of said first light pulse to said receiver device;
   second determining, by said computer co-processor in response to said receiving said first light pulse, if said first light pulse is visible to said receiver device, wherein results of said second determining indicate that said first light pulse is not visible to said receiver device;
   disabling, in response to said results, said first laser device;
   receiving, by said receiver device from a second laser device of said laser cannon, a second light pulse of said plurality of multi-frequency light pulses, said second light pulse comprising a second frequency for testing a visibility of said second light pulse to said receiver device; and third determining, by said computer co-processor in response to said receiving said second light pulse, if said second light pulse is visible to said receiver device.

2. The method of claim 1, wherein results of said third determining indicate that said first light pulse is visible to said receiver device, and wherein said method further comprises:

determining, by said computer co-processor, that all laser devices of said laser cannon have been tested for visibility to said receiver device;

receiving, by said receiver device from a group of laser devices of said laser cannon, a group of light pulses of said plurality of multi-frequency light pulses, said group of light pulses comprising a combination of frequencies for testing visibilities of said group of light pulses to said receiver device; and fourth determining, by said computer co-processor in response to said receiving said group of light pulses, if said group of light pulses is visible to said receiver device.

3. The method of claim 2, wherein results of said fourth determining indicate that said group of light pulses is not visible to said receiver device, and wherein said method further comprises:

disabling a laser device of said group of laser devices;

additionally receiving, by said receiver device from an additional group of laser devices of said laser cannon, an additional group of light pulses of said plurality of multi-frequency light pulses, said additional group of light pulses comprising an additional combination of frequencies for testing visibilities of said additional group of light pulses at said receiver device, said additional group of light pulses differing from said group of light pulses; and fifth determining, by said computer co-processor in response to said additionally receiving, if said additional group of light pulses is visible to said receiver device.

4. The method of claim 3, wherein results of said fifth determining indicate that said additional group of light pulses is not visible to said receiver device, and wherein said method further comprises:

determining, by said computer co-processor, that a retry threshold for repeating said additionally receiving and said fifth determining has not been exceeded; and repeating said additionally receiving and said fifth determining.

5. The method of claim 2, wherein results of said fourth determining indicate that said group of light pulses is visible to said receiver device, and wherein said method further comprises:

additionally receiving, by said receiver device from an additional group of laser devices of said laser cannon, an additional group of light pulses of said plurality of multi-frequency light pulses, said additional group of light pulses comprising an additional combination of frequencies for testing visibilities of said additional group of light pulses to said receiver device, said additional group of light pulses differing from said group of light pulses; and fifth determining, by said computer co-processor in response to said additionally receiving, if said additional group of light pulses is visible to said receiver device.

6. The method of claim 5, wherein results of said fifth determining indicate that said additional group of light pulses is not visible to said receiver device, and wherein said method further comprises:

determining, by said computer co-processor, that a retry threshold for repeating said additionally receiving and said fifth determining has not been exceeded; and repeating said additionally receiving and said fifth determining.

7. A receiver device comprising a computer co-processor coupled to a computer-readable memory unit, said memory unit comprising instructions that when executed by the computer processor implements a bandwidth throttling calibration method comprising:

first determining, by said computer co-processor of said receiver device, that a plurality of multi-frequency light pulses, received from a laser cannon via a plurality of channels, comprises an out of band (OOB) signal transmitted over a first channel of said plurality of channels;

receiving, by said receiver device from a first laser device of said laser cannon, a first light pulse of said plurality of multi-frequency light pulses, said first light pulse comprising a first frequency for testing a visibility of said first light pulse to said receiver device;

second determining, by said computer co-processor in response to said receiving said first light pulse, if said first light pulse is visible to said receiver device, wherein results of said second determining indicate that said first light pulse is not visible to said receiver device;

disabling, in response to said results, said first laser device;

receiving, by said receiver device from a second laser device of said laser cannon, a second light pulse of said plurality of multi-frequency light pulses, said second light pulse comprising a second frequency for testing a visibility of said second light pulse to said receiver device; and third determining, by said computer co-processor in response to said receiving said second light pulse, if said second light pulse is visible to said receiver device.

8. The receiver device of claim 7, wherein results of said third determining indicate that said first light pulse is visible to said receiver device, and wherein said method further comprises:

determining, by said computer co-processor, that all laser devices of said laser cannon have been tested for visibility to said receiver device;

receiving, by said receiver device from a group of laser devices of said laser cannon, a group of light pulses of said plurality of multi-frequency light pulses, said group of light pulses comprising a combination of frequencies for testing visibilities of said group of light pulses to said receiver device; and fourth determining, by said computer co-processor in response to said receiving said group of light pulses, if said group of light pulses is visible to said receiver device.

9. The receiver device of claim 8, wherein results of said fourth determining indicate that said group of light pulses is not visible to said receiver device, and wherein said method further comprises:

disabling a laser device of said group of laser devices;

additionally receiving, by said receiver device from an additional group of laser devices of said laser cannon, an additional group of light pulses of said plurality of multi-frequency light pulses, said additional group of light pulses comprising an additional combination of frequencies for testing visibilities of said additional group of light pulses to said receiver device, said additional group of light pulses differing from said group of light pulses; and fifth determining, by said computer co-processor in response to said additionally receiving, if said additional group of light pulses is visible to said receiver device.

10. The receiver device of claim 9, wherein results of said fifth determining indicate that said additional group of light pulses is not visible to said receiver device, and wherein said method further comprises:

determining, by said computer co-processor, that a retry threshold for repeating said additionally receiving and said fifth determining has not been exceeded; and repeating said additionally receiving and said fifth determining.

11. The receiver device of claim 8, wherein results of said fourth determining indicate that said group of light pulses is visible to said receiver device, and wherein said method further comprises:

additionally receiving, by said receiver device from an additional group of laser devices of said laser cannon, an additional group of light pulses of said plurality of multi-frequency light pulses, said additional group of light pulses comprising an additional combination of frequencies for testing visibilities of said additional group of light pulses to said receiver device, said additional group of light pulses differing from said group of light pulses; and fifth determining, by said computer co-processor in response to said additionally receiving, if said additional group of light pulses is visible to said receiver device.

12. The receiver device of claim 11, wherein results of said fifth determining indicate that said additional group of light pulses is not visible to said receiver device, and wherein said method further comprises:

determining, by said computer co-processor, that a retry threshold for repeating said additionally receiving and said fifth determining has not been exceeded; and repeating said additionally receiving and said fifth determining.

13. A computer program product, comprising a computer readable hardware storage device storing a computer readable program code, said computer readable program code comprising an algorithm that when executed by a co-processor of a receiver device implements a bandwidth throttling calibration method, said method comprising:

first determining, by said computer co-processor of said receiver device, that a plurality of multi-frequency light pulses, received from a laser cannon via a plurality of channels, comprises an out of band (OOB) signal transmitted over a first channel of said plurality of channels;

receiving, by said receiver device from a first laser device of said laser cannon, a first light pulse of said plurality of multi-frequency light pulses, said first light pulse comprising a first frequency for testing a visibility of said first light pulse to said receiver device;

second determining, by said computer co-processor in response to said receiving said first light pulse, if said first light pulse is visible to said receiver device, wherein results of said second determining indicate that said first light pulse is not visible to said receiver device;

disabling, in response to said results, said first laser device;

receiving, by said receiver device from a second laser device of said laser cannon, a second light pulse of said plurality of multi-frequency light pulses, said second light pulse comprising a second frequency for testing a visibility of said second light pulse to said receiver device; and third determining, by said computer co-processor in response to said receiving said second light pulse, if said second light pulse is visible to said receiver device.

14. The computer program product of claim 13, wherein results of said third determining indicate that said first light pulse is visible to said receiver device, and wherein said method further comprises:

determining, by said computer co-processor, that all laser devices of said laser cannon have been tested for visibility to said receiver device;

receiving, by said receiver device from a group of laser devices of said laser cannon, a group of light pulses of said plurality of multi-frequency light pulses, said group of light pulses comprising a combination of frequencies for testing visibilities of said group of light pulses to said receiver device; and fourth determining, by said computer co-processor in response to said receiving said group of light pulses, if said group of light pulses is visible to said receiver device.

15. The computer program product of claim 14, wherein results of said fourth determining indicate that said group of light pulses is not visible to said receiver device, and wherein said method further comprises:

disabling a laser device of said group of laser devices;

additionally receiving, by said receiver device from an additional group of laser devices of said laser cannon, an additional group of light pulses of said plurality of multi-frequency light pulses, said additional group of light pulses comprising an additional combination of frequencies for testing visibilities of said additional group of light pulses to said receiver device, said additional group of light pulses differing from said group of light pulses; and fifth determining, by said computer co-processor in response to said additionally receiving, if said additional group of light pulses is visible to said receiver device.

16. The computer program product of claim 15, wherein results of said fifth determining indicate that said additional group of light pulses is not visible to said receiver device, and wherein said method further comprises:

determining, by said computer co-processor, that a retry threshold for repeating said additionally receiving and said fifth determining has not been exceeded; and repeating said additionally receiving and said fifth determining.

17. The computer program product of claim 14, wherein results of said fourth determining indicate that said group of light pulses is visible to said receiver device, and wherein said method further comprises:

additionally receiving, by said receiver device from an additional group of laser devices of said laser cannon, an additional group of light pulses of said plurality of multi-frequency light pulses, said additional group of light pulses comprising an additional combination of frequencies for testing visibilities of said additional group of light pulses to said receiver device, said additional group of light pulses differing from said group of light pulses; and fifth determining, by said computer co-processor in response to said additionally receiving, if said additional group of light pulses is visible to said receiver device.

18. The computer program product of claim 13, wherein results of said fifth determining indicate that said additional group of light pulses is not visible to said receiver device, and wherein said method further comprises:

determining, by said computer co-processor, that a retry threshold for repeating said additionally receiving and said fifth determining has not been exceeded; and repeating said additionally receiving and said fifth determining.

\* \* \* \* \*